Aug. 18, 1936.                    L. E. LUCE                    2,051,791
                       MAGNIFYING AND CONDENSING DEVICE
                            Filed April 16, 1935
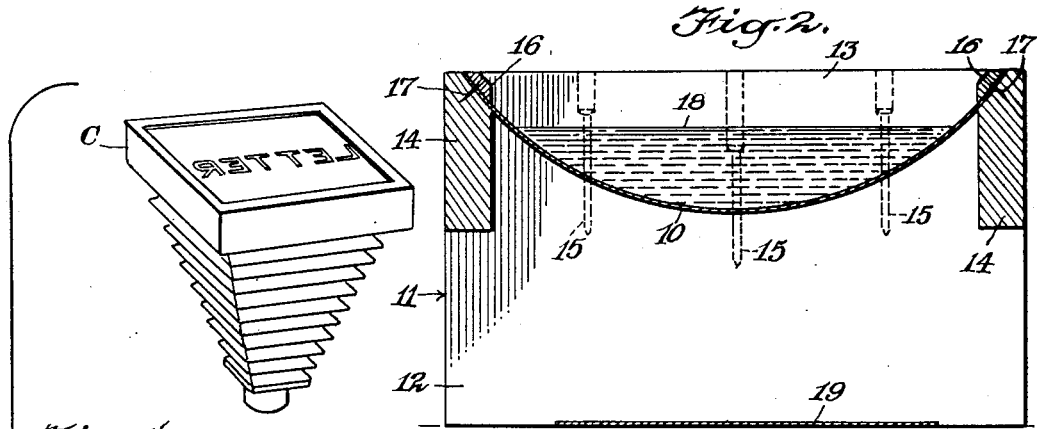
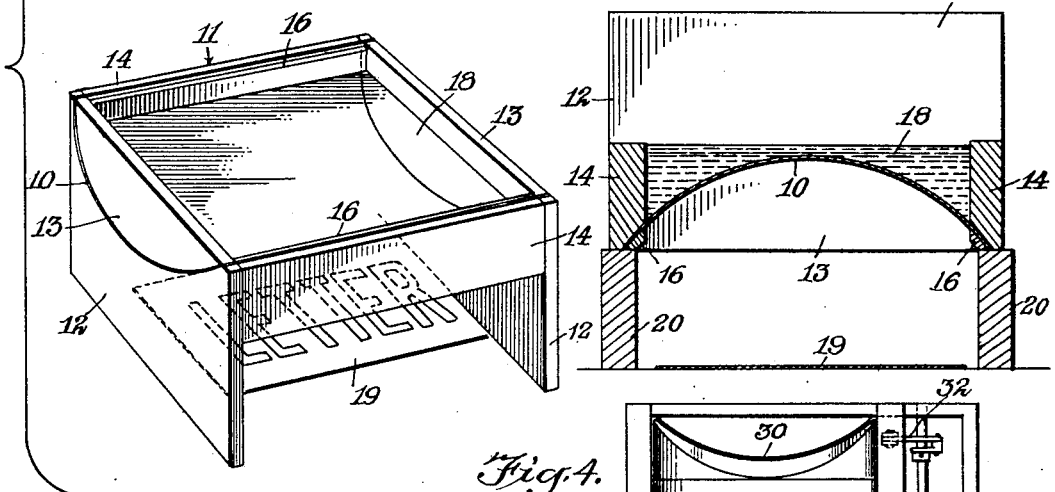
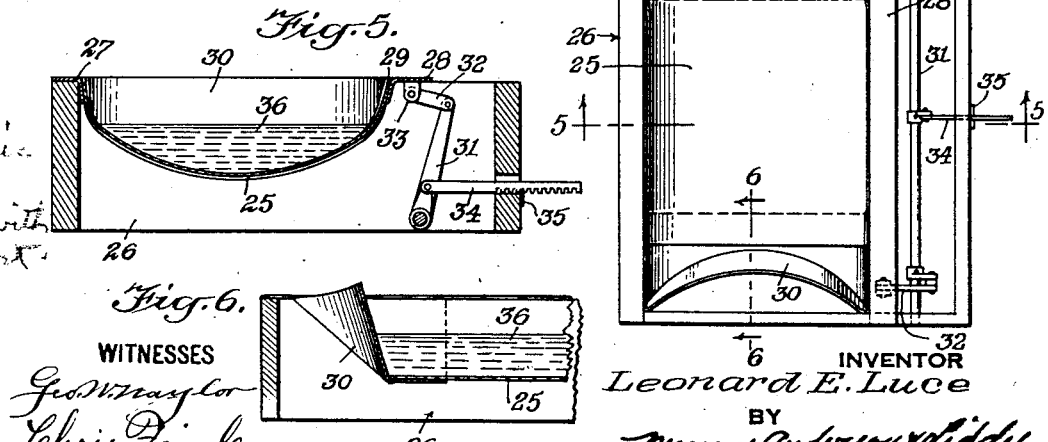
WITNESSES
                                                INVENTOR
                                           Leonard E. Luce
                                               BY
                                                    ATTORNEYS Patented Aug. 18, 1936

2,051,791

UNITED STATES PATENT OFFICE 2,051,791

MAGNIFYING AND CONDENSING DEVICE

Leonard E. Luce, Pelham, N. Y.

Application April 16, 1935, Serial No. 16,728

4 Claims. (Cl. 88—39)

This invention relates to a device which is designed and adapted to be used as a lens for magnifying and condensing "copy".

The device may be used advantageously in carrying out the routine of those engaged in producing copy to be used for printing advertisements and other matter. This routine calls for the making of changes in the size and proportion of captions, headings, titles, designs, etc., while preserving the character thereof, which shall be suitable for changes in space requirements, for advertising matter.

The principal object of the invention is the provision of an inexpensive device for effectually carrying out the desired results, quickly and easily at low cost, by facsimile reproducing in character, but modifying in size and proportion, original copy, to meet changes in "space" requirements, without resorting to the remaking of more expensive original copy to meet said changes in space requirements.

A further object of the invention is the provision of a device of the indicated character which is susceptible to change or adjustment whereby a wide variation in the size and proportion of copy may be obtained.

The nature of the invention and its distinguishing features and advantages will appear when the following specification is read in connection with the accompanying drawing, in which:

Fig. 1 is a perspective view of a device embodying the invention in use;

Fig. 2 is a transverse section through the device used as a plano-convex lens;

Fig. 3 is a transverse section through the device converted for use as a plano-concave lens;

Fig. 4 is a plan of a modified form of device embodying the invention;

Fig. 5 is an enlarged transverse section taken on the line 5—5 of Fig. 4; and

Fig. 6 is an enlarged section taken on the line 6—6 of Fig. 4.

One embodiment of the invention is illustrated in Figs. 1, 2 and 3. This embodiment of the invention includes an element 10 which is made of clear transparent material, such as sheet celluloid, or any other inexpensive analogous material. The element 10 may be of any size and is rectangular in shape, the same being square in the present instance. The element 10 is retained curved in a concavo-convex formation. This may be accomplished by any suitable and practical means in the form of a frame-like structure 11. The structure 11 consists of end sections 12 and 13 respectively, and side members 14. An end section 12 and 13 is secured to each end edge portion of the element 10, said sections 12 and 13 being cut to a curvature conforming to the curvature of the element 10. The sections 12 and 13 are secured in clamping engagement to the element 10 by suitable fastening elements 15, which extend in the sections 12 and 13 and through the element 10. The side members 14 are secured to the end sections 12 between the same in spaced parallel relation to each other. The opposite side edge portions of the element 10 are secured to the side members 14 by strips 16 held in place by suitable fastening elements 17. The structure 11 is adapted to be arranged on a suitable support, to hold the element 10 disposed horizontally. The end sections 13 in relation to the element 10 constitute dam means to hold a quantity of liquid 18 on the element 10. The liquid used is clear and transparent, such as distilled water or mineral oil and the like. The liquid when arranged on the concave surface of the element 10 will constitute with the element 10 a plano-convex lens. It is to be understood that the element 10 may be retained at any desired curvature so as to obtain any desired focal length. The lens thus constituted by the element 10 and the liquid 18 will be a cylindrical converging lens.

The device described hereinabove may be used for magnifying and condensing copy of the character hereinabove mentioned. As shown in Fig. 1 the device is shown in use in conjunction with a copying camera C arranged above the device, while the copy 19 is positioned below the element 10. It is to be understood that the copy 19 will be arranged at the proper distance from the element 10 to obtain the desired size and proportion of the image which will be registered or photographed on a film or plate within the camera C. As shown the copy 19 is condensed or reduced in height while preserving the width thereof. It will also be understood that the copy may be arranged transversely of the curved surface of the element 10 at the proper distance, in which case the copy will be condensed as to width while preserving the height thereof. In this manner changes may be made in the size and proportion of captions, headings, titles and designs, while preserving the character thereof, which will be suitable for changes in space requirements for advertising matter.

If desired the device may be used to give the effect of a plano-concave lens by inverting the device and arranging it on suitable blocks or furniture 20 to elevate it as may be desired. It will be apparent that the end sections 12 and side members 14 constitute a dam to hold the liquid 18 on the element 10 over its convex surface, thus constituting with the element 10 a plano-concave or cylindrical diverging lens. The action of the lens thus constituted on the rays of light traversing the same will be to diverge the rays. Therefore copy may be increased in one dimension while preserving its other dimension. In other words, the height of a copy may be increased while preserving the width thereof, and vice versa, depending upon the manner in which the copy is arranged with relation to the concave surface of the element 10.

In Figs. 4, 5 and 6 there is shown a modified form of device for obtaining changes in the focal length of the lens constituted in the device. This device therefore includes an element 25 of clear transparent flexible sheet material such as celluloid. The device also includes a rectangular frame 26. One side edge portion of the element 25 is secured to one side of the frame as at 27. The device also includes a movable rigid member 28 secured to the other side edge portion of the element 25 as at 29. Use is made of flexible end members 30 secured respectively to the opposite end edge portions of the element 25 in any suitable manner. These end members may be made of water-proofed fabric or the like. Each end member 30 is also secured at the sides to the frame 26 and the rigid member 28. The frame 26, rigid member 28 and the end members 30 retain the element 25 curved to a concavo-convex formation. The curvature of the element 25 may be changed by moving the rigid member 28 toward the opposite side of the frame 26. The end members 30 flex as the member 28 is moved to permit the flexing of the element 25. Suitable means is employed to hold the member 28 against movement. The said means consists of a rock lever 31 fulcrumed on the frame 26 and connected with the member 28 by links 32, through the intervention of lugs 33 on the member 28 with which the links are pivotally connected. A rack 34 is pivotally connected with the lever 31 and the teeth thereof are engageable with a plate 34 secured to the frame 26. The end members 30 in relation to the element 25 serve to hold a quantity of transparent liquid 36 on the concave surface of the element 25 to constitute with the latter a plano-convex lens for the stated purposes.

I claim:

1. A magnifying and condensing device comprising a rectangular element of transparent flexible sheet material, a structure connected with the edges of said element to retain it curved in a concavo-convex formation, said structure having flexible portions connected with the opposite end edges respectively of the element, whereby to adjust the structure to vary the curvature of said element, a dam embodied by said structure at each end of said element, and a quantity of transparent liquid held by said dams on said element constituting with the latter a lens.

2. A magnifying and condensing device comprising an element of transparent flexible sheet material, a frame, one side edge portion of said element being secured to one side of said frame, a movable rigid member secured to the other side edge portion of said element, flexible end members secured respectively to the opposite end edge portions of said element and also secured to said side of the frame and the rigid member, the provision and arrangement being such that said rigid member may be moved to flex said element to curve it into a concavo-convex formation and also to vary the curvature thereof, means connected with said rigid member to hold it to maintain the desired curvature of said element, and a quantity of transparent liquid held by said element constituting therewith a lens.

3. A magnifying and condensing device comprising a rectangular element of transparent flexible sheet material, a structure connected with the edges of said element to retain it curved in a concavo-convex formation, said structure including a rigid member connected with one edge of said element and being adjustable to vary the curvature of said element, a dam embodied by said structure at each end of said element, and a quantity of transparent liquid held by said dams on said element constituting with the latter a cylindrical lens.

4. A magnifying and condensing device comprising a rectangular element of transparent flexible sheet material, a structure connected with the edges of said element to retain it curved in a concavo-convex formation, said structure including flexible portions connected with the opposite end edges respectively of the element, and a rigid portion connected with one longitudinal edge of said element and having its opposite ends connected with said flexible portions respectively, said rigid portion being adjustable to vary the curvature of said element, a dam embodied by said structure at each end of said element, and a quantity of transparent liquid held by said dams on said element constituting with the latter a cylindrical lens.

LEONARD E. LUCE.